No. 687,912. Patented Dec. 3, 1901.
R. W. BARKER.
HEDDLE MACHINE.
(Application filed Sept. 8, 1900.)
(No Model.) 11 Sheets—Sheet 1.

WITNESSES: INVENTOR,
Wm D Bell Robert W. Barker,
James B. Newton. BY
Gartner Steward
ATTORNEYS.

THE NORRIS PETERS CO., PHOTO-LITHO., WASHINGTON, D. C.

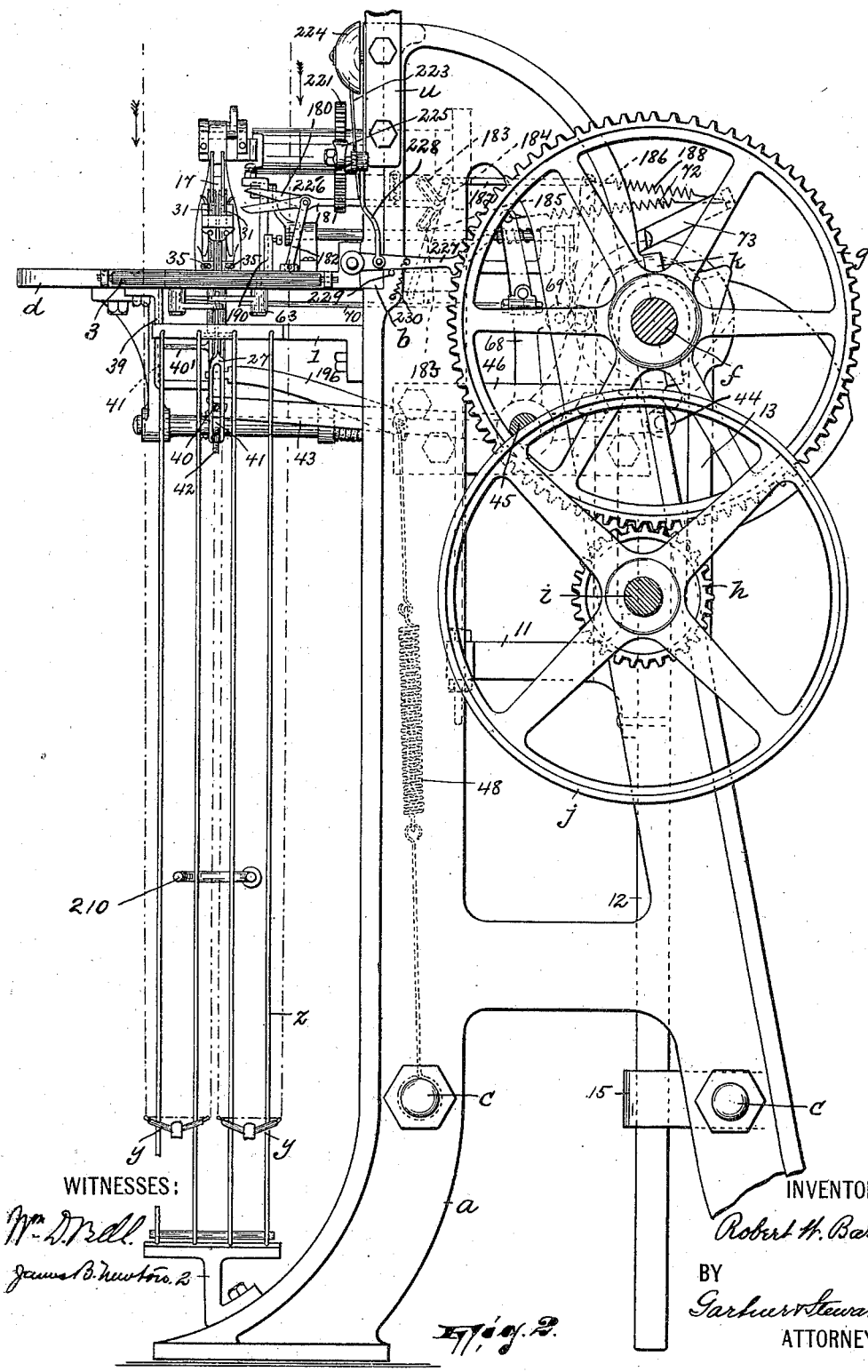

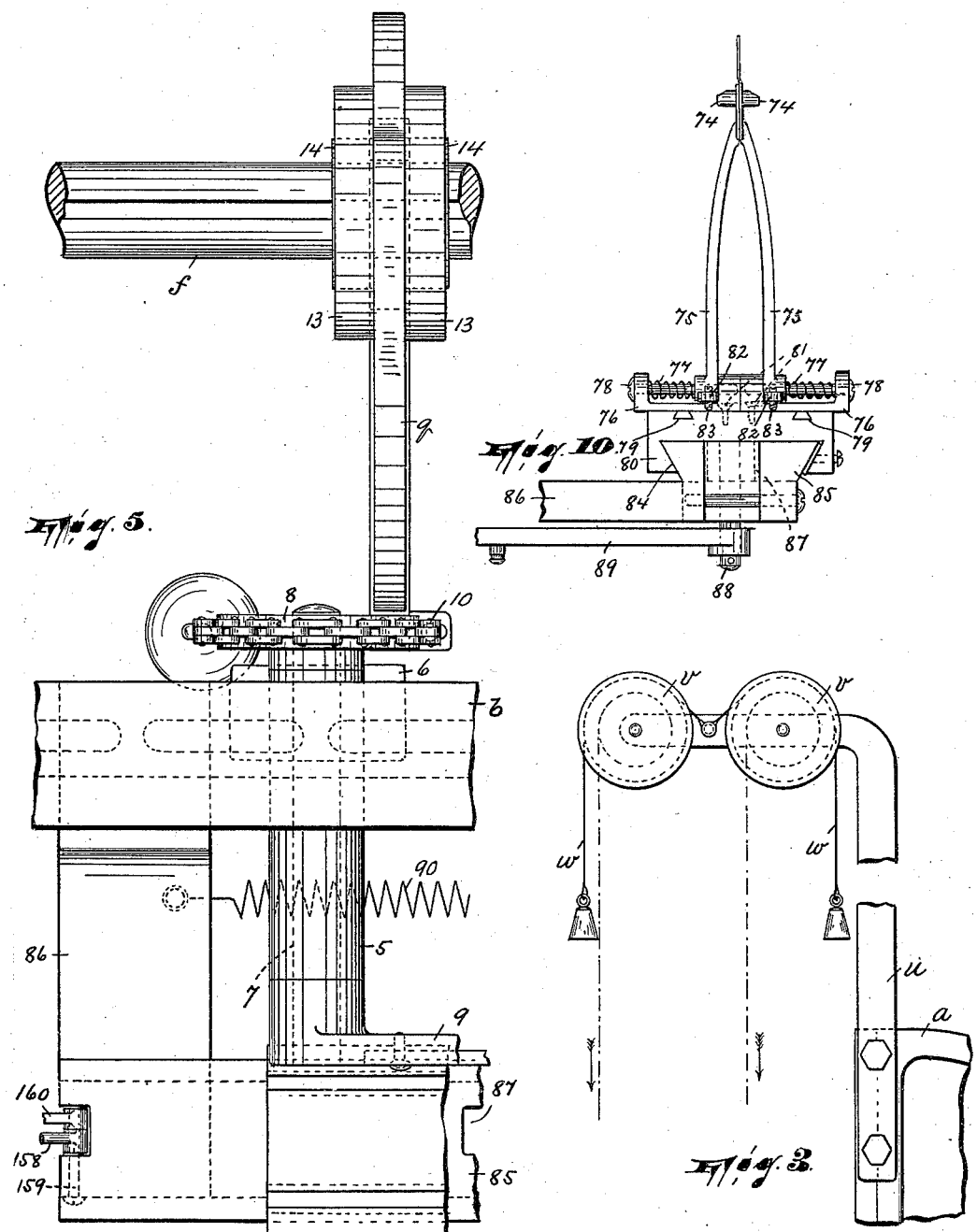

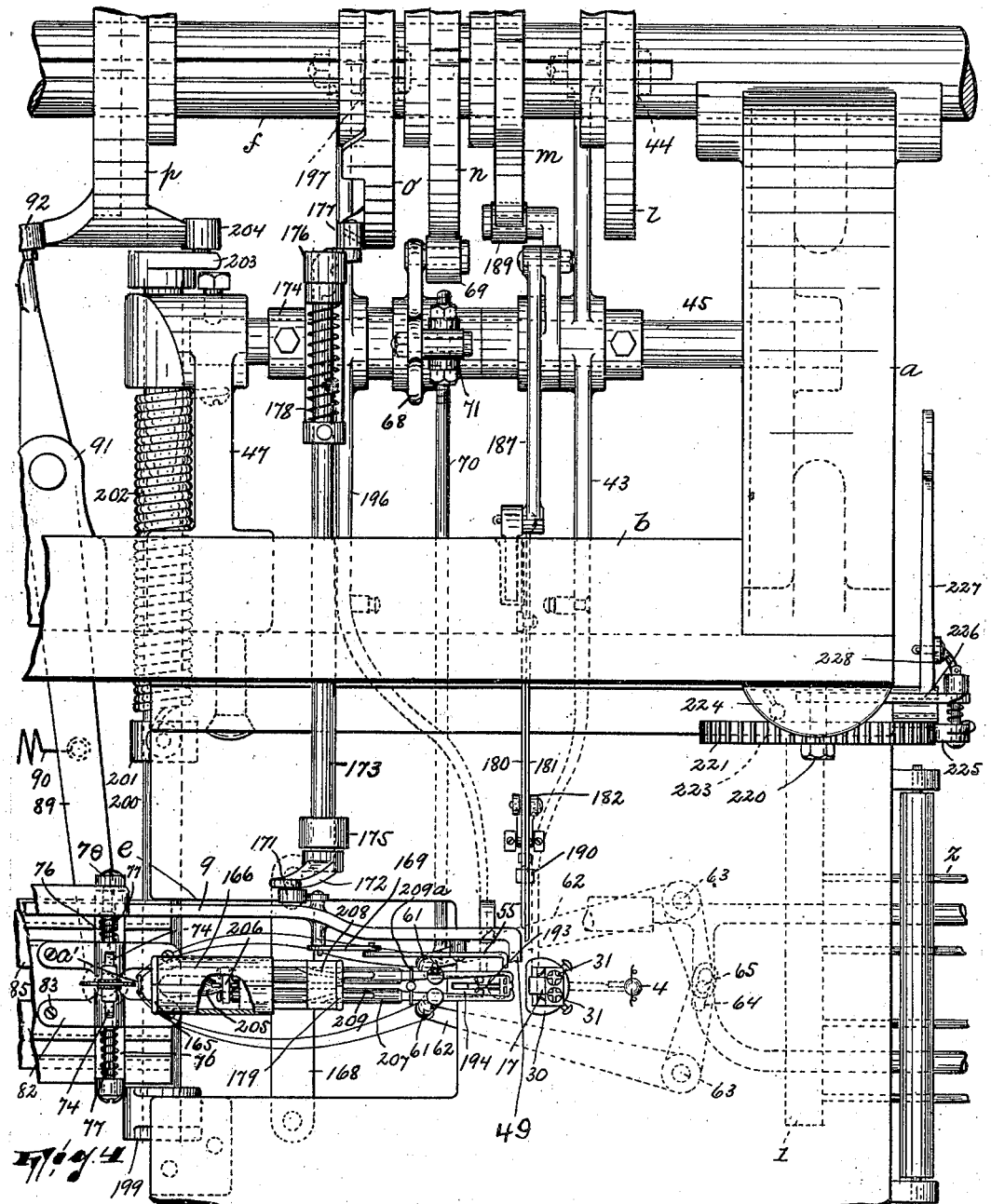

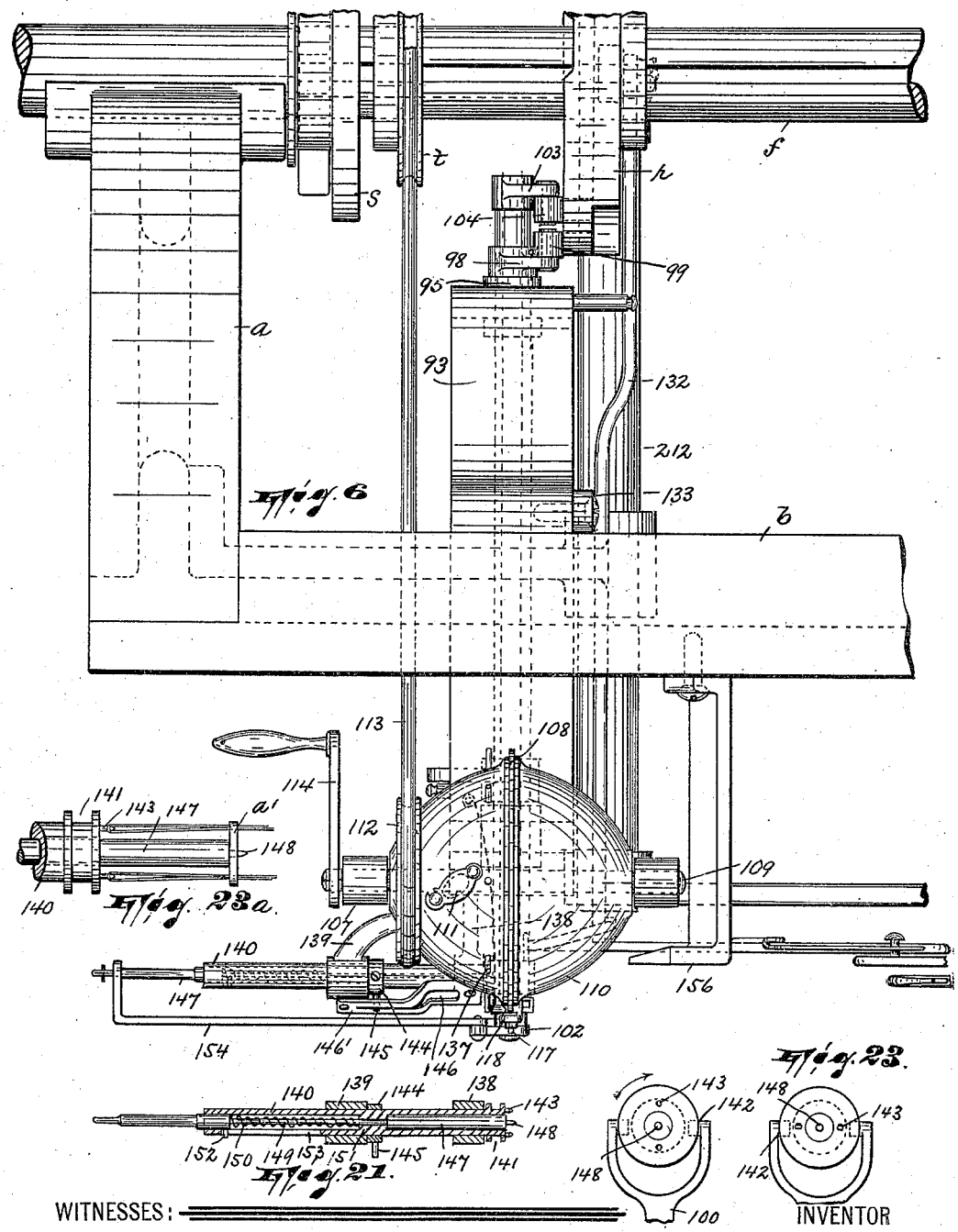

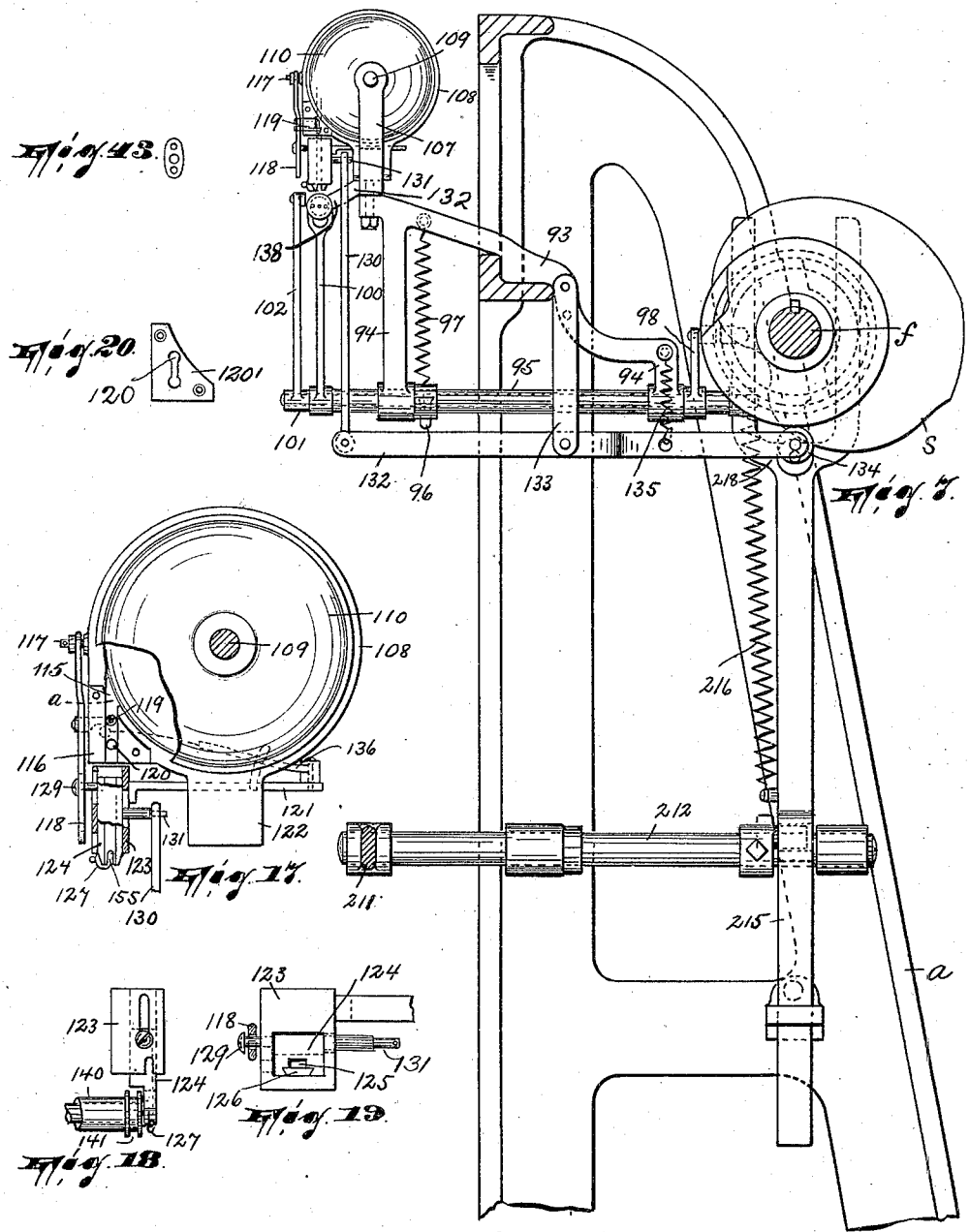

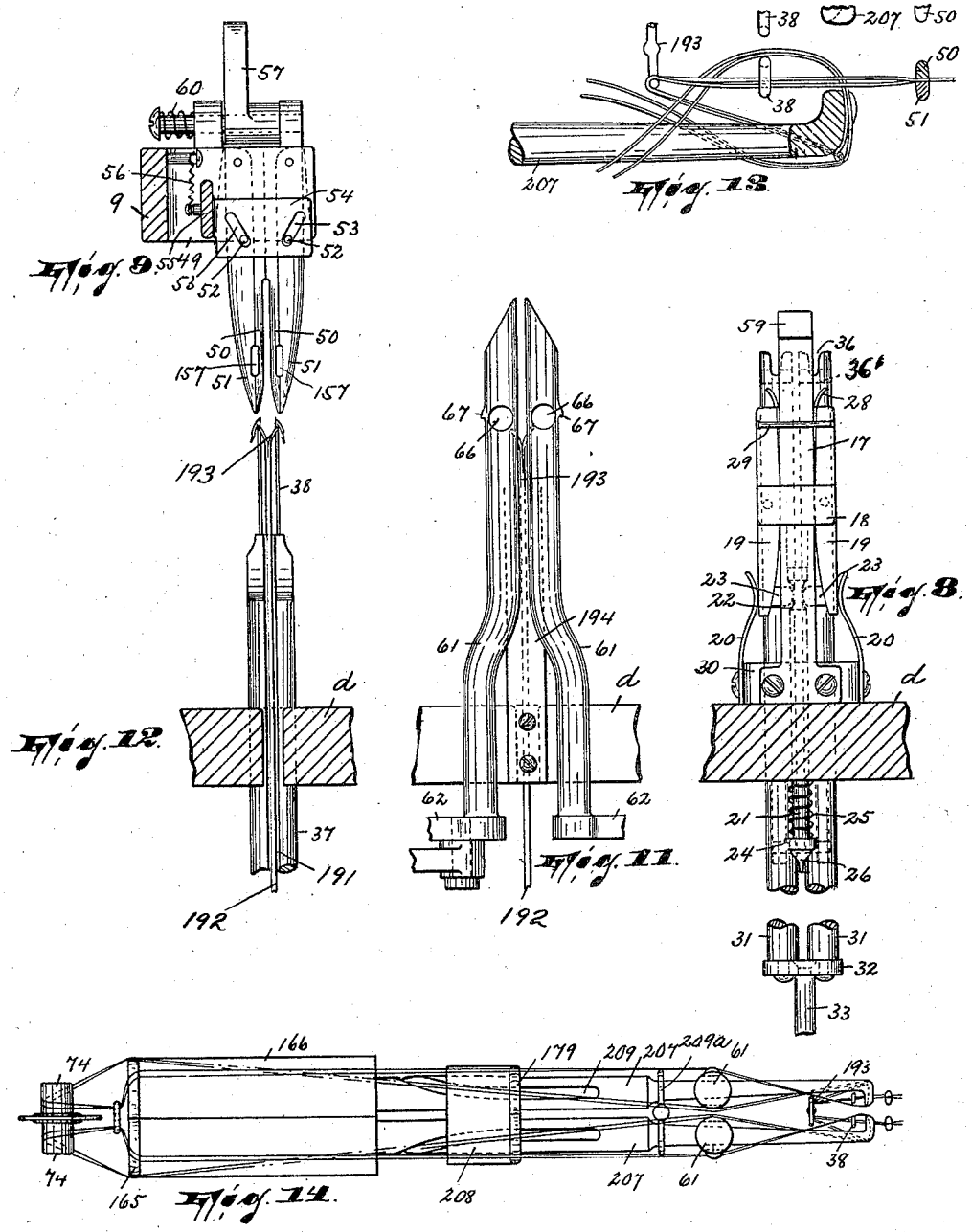

No. 687,912. Patented Dec. 3, 1901.
R. W. BARKER.
HEDDLE MACHINE.
(Application filed Sept. 8, 1900.)
(No Model.) 11 Sheets—Sheet 8.
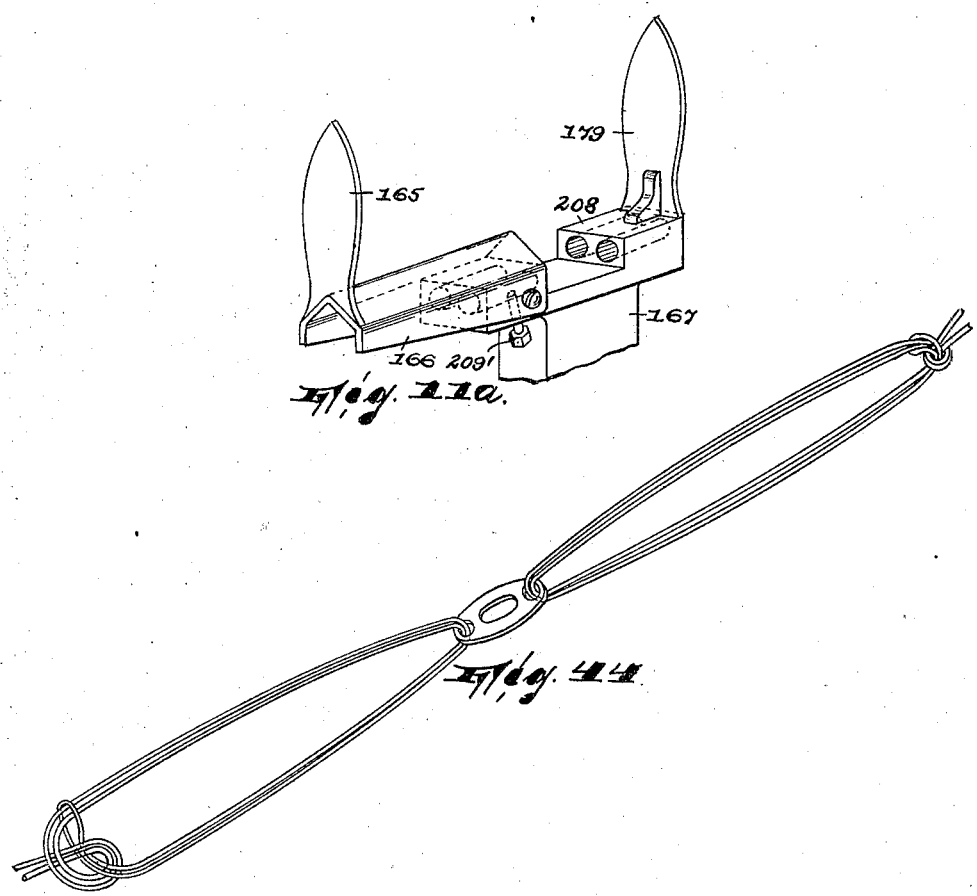
WITNESSES:
INVENTOR,
Robert W. Barker,
BY
Gartner & Steward,
ATTORNEYS.

No. 687,912. Patented Dec. 3, 1901.
R. W. BARKER.
HEDDLE MACHINE.
(Application filed Sept. 8, 1900.)
(No Model.) 11 Sheets—Sheet 9.
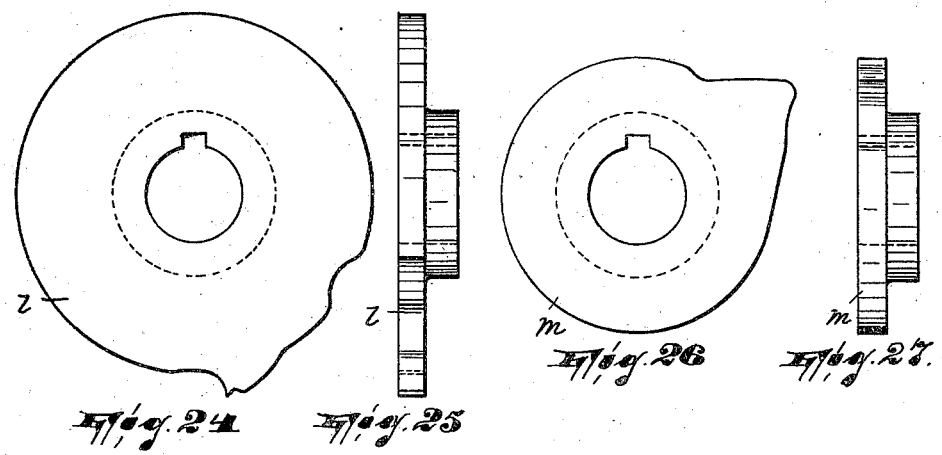
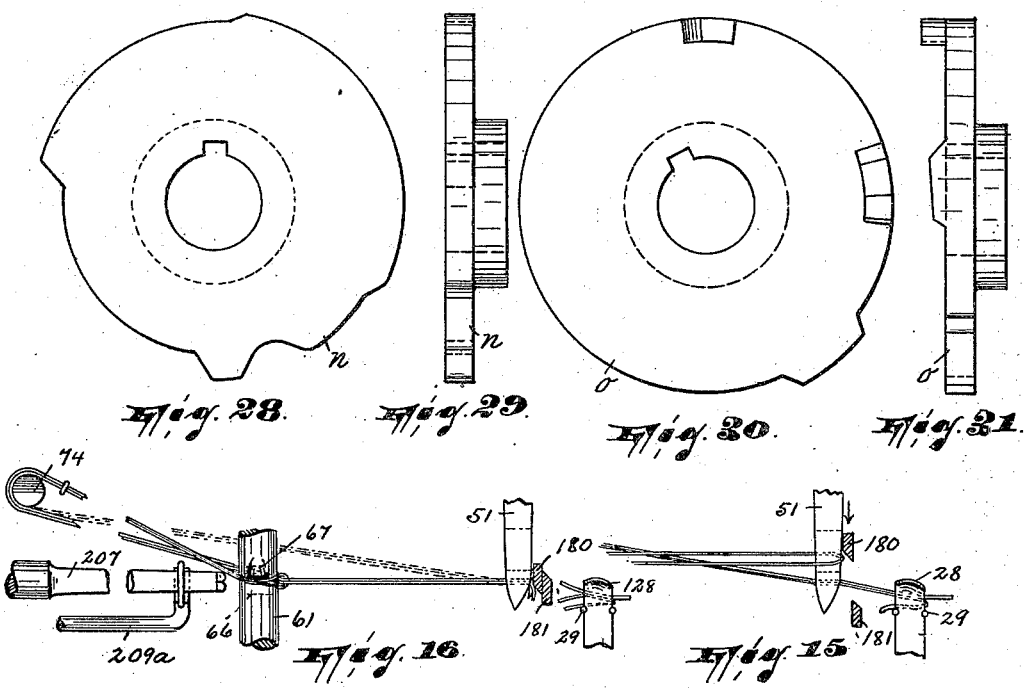
WITNESSES: INVENTOR,
Wm D. Bell. Robert W. Barker,
James B. Newton. BY
Gartner & Steward
ATTORNEYS.

No. 687,912.  
R. W. BARKER.  
HEDDLE MACHINE.  
(Application filed Sept. 8, 1900.)  
Patented Dec. 3, 1901.

(No Model.)

11 Sheets—Sheet 10.

WITNESSES:  
Wm. D. Bell  
James B. Newton

INVENTOR,  
Robert W. Barker,  
BY  
Gartner & Steward  
ATTORNEYS.

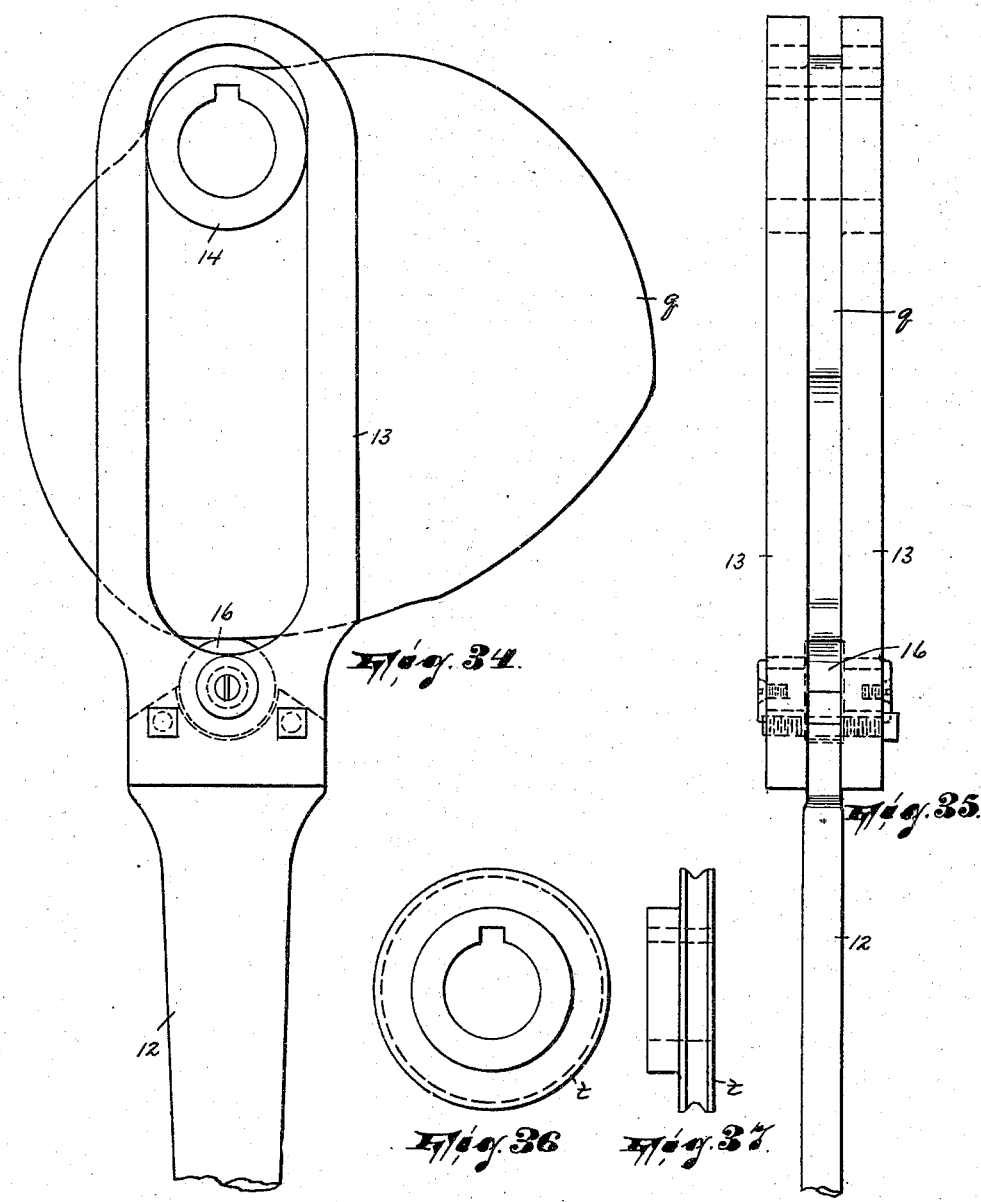

UNITED STATES PATENT OFFICE.

ROBERT W. BARKER, OF PATERSON, NEW JERSEY.

HEDDLE-MACHINE.

SPECIFICATION forming part of Letters Patent No. 687,912, dated December 3, 1901.

Application filed September 8, 1900. Serial No. 29,388. (No model.)

*To all whom it may concern:*

Be it known that I, ROBERT W. BARKER, a citizen of the United States, residing at No. 147 Tyler street, Paterson, county of Passaic, and State of New Jersey, have invented certain new and useful Improvements in Heddle-Machines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to the manufacture of that portion of the heddles for sustaining the warp-threads in a loom which comprises an eyelet, called a "mail," through which a warp-thread is adapted to pass, and two loops of thread or cord which are strung through the ends of the mail and are adapted the one to be connected with the warp-actuating means and the other to carry the "lingo" or weight.

The object of the invention is to provide a machine which shall perform automatically the several operations of feeding the mails, feeding the thread or cord to form the loops, threading the mails onto the threads or cords, measuring and cutting off the amount of thread needed for each loop, and, lastly, producing the loops by properly knotting the threads.

Figure 1:
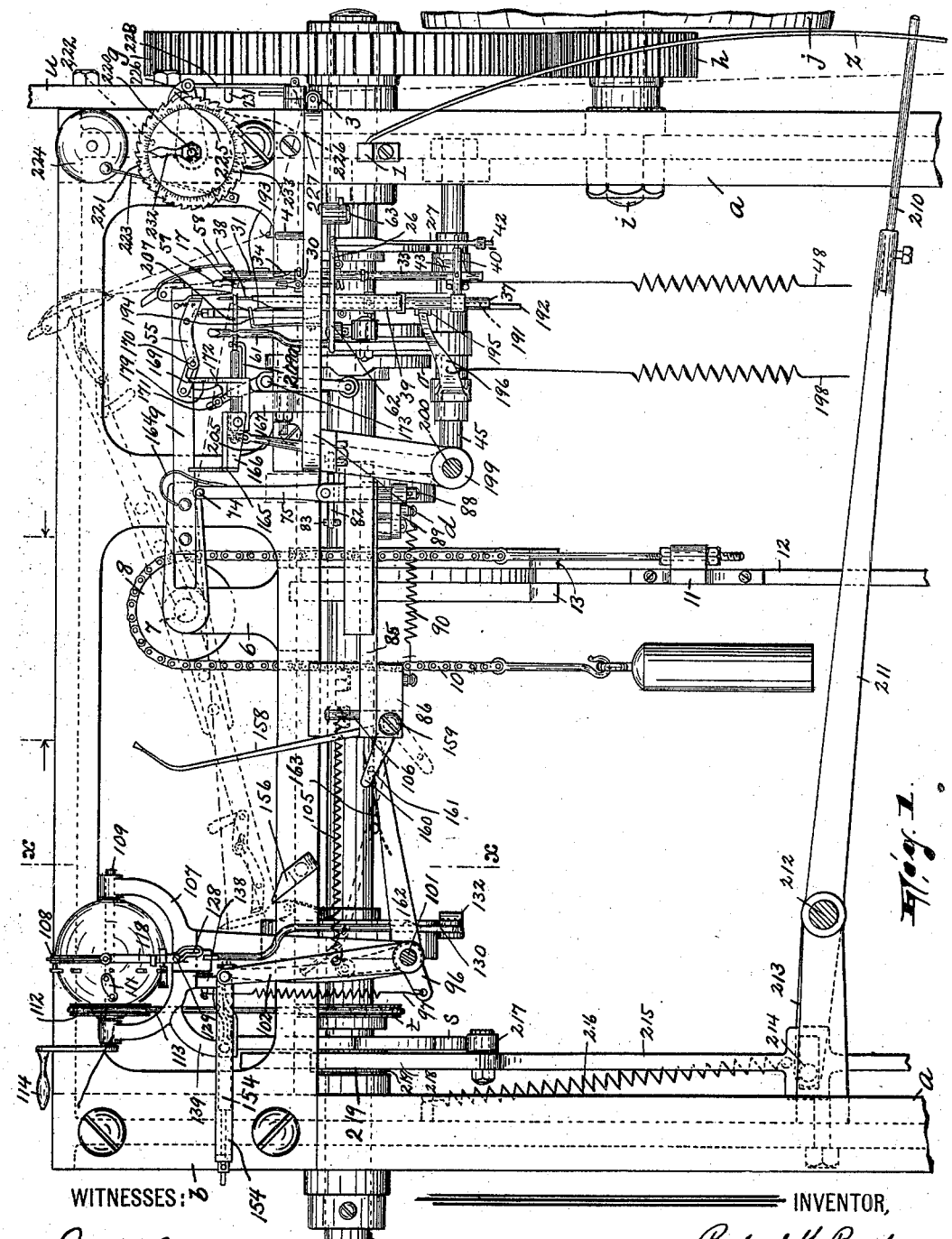
Figure 42:
Figure 39:
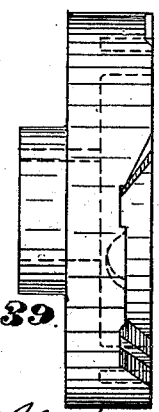
Figure 38:
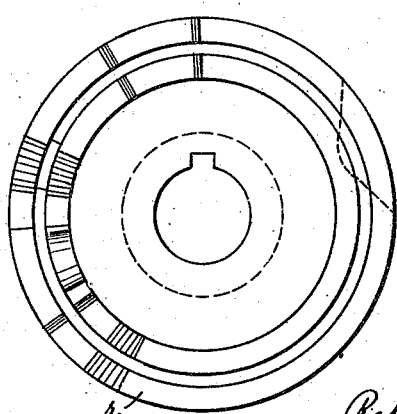
Figure 40:
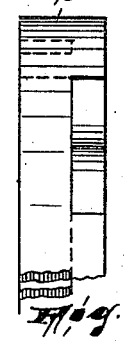

Referring to the accompanying drawings, Figure 1 is a front view of the main portion of the machine. Fig. 2 is an end view in elevation of the right-hand end of the machine, the upper portion thereof being shown as broken away. Fig. 3 shows that portion of the machine which is removed in Fig. 2. Figs. 4, 5, and 6 are enlarged top plan views of, respectively, the right-hand portion, the central portion, and the left-hand portion of the machine, the arrow-heads in Fig. 1 indicating approximately how much each of these portions comprises. Fig. 7 is a sectional view taken on the line $x$ $x$ in Fig. 1. Fig. 8 illustrates a mechanism for holding the ends of the threads or cords which are to form the loops which carry the mails. Fig. 9 is a transverse sectional view of the end of a certain fulcrumed arm which is shown in Fig. 1. Fig. 10 illustrates a device for holding the threads, and thus coacting with said arm to double or loop the threads after having been once looped by said arm. Fig. 11 shows a mechanism for maintaining the end of the loop first formed in each thread separated from the main body of said loop after the second loop is produced. Fig. 11ª is a perspective view of certain parts whereby the loops formed in each thread are maintained separated from each other. Fig. 12 illustrates a reciprocating hook which draws the free ends of each thread through a noose previously produced therein, said noose being adapted to be subsequently drawn up to form a knot. Fig. 13 is an enlarged view showing the disposition of the portions of the thread just previous to forming therein the knot, the noose-forming mechanism being shown. Fig. 14 is a top plan view showing the dispositions of both threads previously to the tying of the knots therein and also showing the mechanism with which at this time said thread engages. Figs. 15 and 16 are enlarged views showing the relative positions of certain parts which coact in forming the nooses in the threads preliminarily to tying the knots therein. Figs. 17, 18, 19, and 20 are detail views of a mechanism for feeding the mails previously to threading them onto the first loops produced in the threads or cords. Fig. 20ª is another detail view of the mechanism for feeding the mails previously to threading them onto the loops, the same being a sectional view on the line $a$ in Fig. 17. Figs. 21, 22, and 23 are detail views of a certain mechanism for threading the mails onto the loops of the threads or cords. Fig. 23ª shows the relative positions of certain parts of the mechanism for threading the mails onto the threads or cords approximately at the time this operation is completed. Figs. 24 to 42, inclusive, excepting Figs. 36 and 37, show cams which produce the several motions in the machine and which are all mounted upon the main shaft of the machine, as seen in Figs. 4, 5, and 6, the cams being illustrated by the respective figures in rotation from right to left and the even-numbered figures showing the faces of said cams, while the odd-numbered figures show the edges thereof, with the exception of Fig. 42, which shows a portion of the edge of the cam shown in Fig. 38. Figs. 36 and 37 are a face and edge view, respectively, of a pulley mounted on said shaft. Fig. 43 is a view of one of the mails, and Fig. 44 is a view of that portion of the heddle which is produced by my machine in complete form.

a designates two uprights which are connected and braced at their upper ends by a skeleton plate b and near their lower ends by rods c.

d designates a table which is bolted to the plate b, at the right-hand end thereof, and in one side of which is formed a rectangular opening e. Back of the plate is journaled in the uprights a horizontal shaft f, said shaft being the main shaft of the machine and carrying at one end a gear g, in mesh with a pinion h, that is journaled upon a stub-shaft i, said pinion being driven from a pulley j. The bearing-caps k, which with the uprights form bearings for said shaft, are shown as removed in Figs. 4 and 6. On this shaft are keyed cams l m n o p q r s and a pulley t.

On a support u, which surmounts the right-hand upright, are journaled bobbins v, constituting the thread-supply, the same being controlled by flexible bands w, passing over them, and each band being secured to the support at one end and weighted at the other end. There are two bobbins, one being adapted to supply the thread for one loop of each finished device and the other being adapted to provide thread for forming the other loop. From the bobbins each thread extends downwardly to one of two weighted slides y, moving on pairs of curved parallel guides z, which are vertically supported in brackets 1 2, projecting from the upright. From the slides the threads extend upwardly over a roller 3, journaled in the end of the table d, and thence through thread-guides 4, their ends being held as hereinafter described.

In the sleeve 5 of a bracket 6, (see Figs. 1 and 5,) secured to the plate b, near the center thereof, is journaled a rock-shaft 7, carrying at its rear end a sprocket-wheel 8 and its forward end an arm 9. Over the sprocket extends a chain 10, the one end of which is weighted and the other end of which is coupled to an arm 11, projecting from a vertical reciprocating rod 12, having its upper end provided with a pair of loops 13, which receive the collars 14 of the cam q. By this means and also by a guide 15, projecting from the rear rod c, a true longitudinal reciprocating movement of the rod 12 is insured. Said rod 12 carries in the crotch formed between its loops a roller 16, which bears against the edge of the cam q, (see Figs. 35 and 34,) said roller being normally held in contact therewith by the weight which controls the sprocket-chain 10. By the mechanism just described it will be seen that the arm 9 may be oscillated, swinging over from approximately the position shown in Fig. 1 to approximately the position shown in dotted lines in said figure.

Adjacent the thread-guide 4 there is secured upon the table d a post 17, in the ends of a cross-piece 18 on which is pivoted a pair of clips 19, one each side of the post, the upper ends of said clips being adapted to coact with the post to grasp the ends of the threads extended through the thread-guides 4, while the lower ends of said clips are normally pressed inwardly by plate-springs 20. In order to spread the lower ends of said clips against the action of the springs, so that the upper ends will be forced inwardly to grasp the threads, a push-rod 21 is provided, the same being vertically disposed and penetrating the post and the table and being provided near its upper end with a wedge 22, which works between lugs 23, projecting inwardly from the clips into the post and bearing against said wedge. The push-rod has a head 24 on its lower end, between which and the table is disposed a spiral spring 25, normally acting to force the push-rod downwardly. The head of the push-rod is engaged by one end of a lever 26, (shown in Fig. 1,) taking against its under side, said lever being fulcrumed to the under side of the table and having a vertically-movable rod 27 pivotally connected to its free end. To facilitate the insertion of the threads into the clips, their upper ends are provided with guides 28, flared away from the post, and in order to prevent the threads from slipping too far downwardly between the post and the clips a small cross-piece 29 is soldered to the face of the post, extending across the clips.

Through the base 30 of the post 17 extend two vertical and parallel revoluble bars 31, which are guided in said base and the table and which are swiveled at their lower ends in the head 32 of a rod 33. The bars 31 are provided with spiral cam-grooves 34, which are engaged by pins 35 (see Figs. 1 and 2) and the pitch of which is sufficient to effect a quarter-revolution of each bar whenever the pair of bars is reciprocated to its full extent in either direction. The top of each of these bars is provided with intersecting cross-cuts 36 36', one being deeper than the other. It will be seen that the action of the bars in turning will bring first the one and then the other of these cross-cuts in alinement with the space between the post and the corresponding guide 28.

37 is a hook-bar carrying hooks 38 at its upper end and penetrating the table, being movable in the extremity of a bracket 39, which is suspended from the table. From said hook-bar projects an arm 40, whose end works in a slot 41 of the bracket, and from the hook-bar projects another arm 40', said last-named arm being pivotally connected to the lower end of the rod 33 between its ends, and also to the rod 27, as shown in Fig. 1. In view of the foregoing it will be seen that any vertical movement of the hook-bar will effect the corresponding movements of the rods 33 and 27. The action of the latter is, however, regulated by a set-screw 42, which it carries. (See Figs. 1 and 2.) The arm 40' is adapted to be reciprocated by a lever 43, whose forward end is forked, engaging said arm 40', while its rear end is provided with a roller 44, which bears against the periphery of the cam $l$. This lever is fulcrumed loosely upon a shaft 45, which is supported at one end in a bracket 46, secured to the right-hand upright, and at its other end in a bracket 47, projecting rearwardly from the plate $b$. A spring 48, connecting this lever and the rod $c$, maintains the roller 44 in contact with the cam.

The end of the arm 9 is turned off at right angles, forming a block 49, from which project downwardly pairs of clips, each clip consisting of a rigid finger 50 and a pivoted finger 51, pins 52 projecting from said pivoted fingers and being received by inclined slots 53 in a plate 54, constituting the end portion of a lever 55, that is fulcrumed on the arm 9, being controlled by a spring 56, which connects it with the arm. By shifting the lever 55, as will be hereinafter described, the pivoted fingers are operated so as to open and close the clips. Upon the top of the block 49 is fulcrumed a bell-crank lever 57, one arm of which carries a pair of hooks 58. When the arm swings over to the position in which it is shown in full lines in Fig. 1, these hooks wipe upon the inclined top 59 of the post 17, clearing the tops of the bars 31 and taking a position against their outer sides, against which they are held by a spiral spring 60, which actuates the lever 57 in an obvious manner.

61 designates laterally-movable and vertical spacer-bars, which are carried upon the ends of bell-crank levers 62, projecting upwardly through the opening $e$ in the table. Said levers 62 are fulcrumed at 63 upon the under side of the table, and the end of one of their free arms is provided with a slot 64, (see Fig. 4,) with which engages a pin 65 of the other. The spacer-bars are not perfectly straight, but each has a slight curvature to the left, as seen in Fig. 1, near its base. Their tops are tapered off, as seen in Fig. 11, and each is provided with an opening 66 and a spur 67 on its outer face, the function of which will be hereinafter described. In order to actuate the bell-crank levers and move the spacer-bars, operative connection with the drive-shaft is effected through the medium of the cam $n$, a lever 68, fulcrumed on the shaft 45 and carrying a roller 69, engaging said cam, and a connecting-rod 70, pivotally secured to the adjoining lever 62 on one of its ends and connected at the other of its ends with the other arm of the lever 68 by a coupling 71. A spring 72 connects the lever 68 with a bracket 73, projecting from the adjacent end upright to a position opposite the cam $n$.

Figure 32:
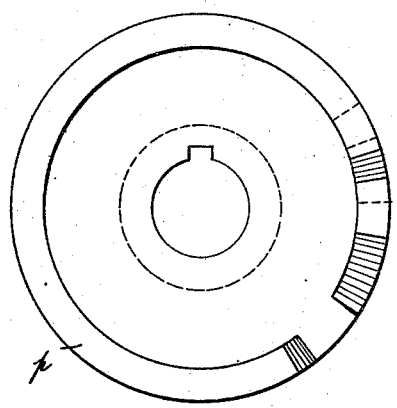
Figure 33:
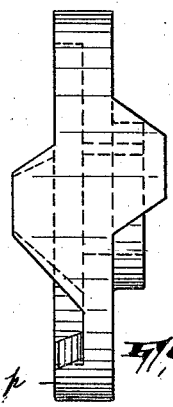
Figure 41:
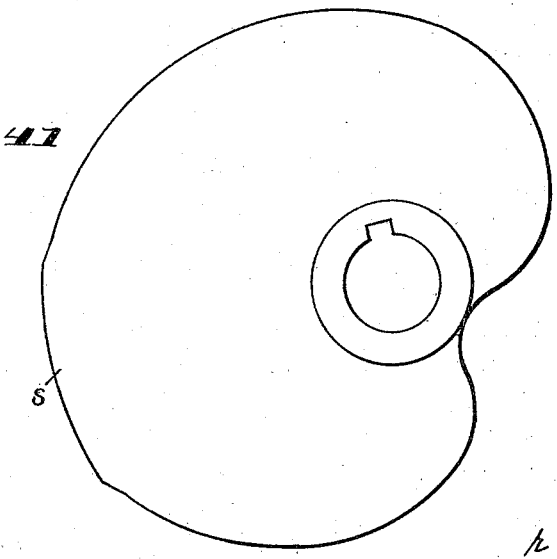

Assuming that the ends of the threads or cords which have been led into the machine are held by the clips 19 and that they extend between said clips and the thread-guides 4 through the shallow cross-cuts in the bars 31, if said bars are actuated to impart to them the quarter-revolutions, as above described, the deeper cross-cuts instead of the shallow ones will be in alinement with the points of the hooks 58. If now the arm 9 swings over as the points of its hooks 58 move upwardly, they will slip into the deep cross-cuts beneath the threads or cords in the shallow cross-cuts, and being moved farther upwardly will snap against the clips on the end of said arm, and so the arm will loosely hold said threads. When the arm has completed its movement, or substantially so, a loop will be formed in each thread, the same extending from the clips 19 to the clips on the end of said arm. Between these two points, as the arm reached the limit of its movement, the two loops thus formed slipped over the beveled ends of outwardly-projecting pins 74 on the upper ends of vertically-disposed levers 75. Each lever 75 is fulcrumed upon a rest 76, being connected with said rest by a spiral spring 77, which is coiled about the fulcruming-pin 78. Each rest has a dovetailed tongue-and-groove connection 79 with a carriage 80, on which said rests are mounted side by side, adjustment being effected by screws 81. In order to obtain a more delicate adjustment than is susceptible by the arrangement just referred to, each lever carries in an arm 82, projecting from it, a set-screw 83, which is held against the top of the carriage by the spring 77. The carriage 80 has a dovetailed groove 84 in its under face, which receives the correspondingly-shaped arm 85 of a bracket 86, projecting from the plate $b$ of the frame. The arm 85 extends in alinement with and projects almost into the opening $e$ in the table. It is provided with a slot 87 under the carriage and through which projects downwardly a pin 88, to which is connected the forward end of a lever 89, controlled by a spring 90, connecting it with the bracket 86, and fulcrumed in a support 91, extending rearwardly from the plate $b$, the rear end of said lever carrying a roller 92, which bears against one face of the cam $p$. As shown in Figs. 4 and 32, both faces of the cam $p$ are made use of, the one to actuate said lever 89 and the other to actuate mechanism hereinafter to be described. The reason for reciprocating the carriage 80, and with it the levers 75, by means of the lever 89 will be hereinafter set forth. The arm being swung over to the position shown in dotted lines in Fig. 1 and in that position holding the loop which it has formed in each thread, the mails are threaded onto said threads. The mechanism for effecting this and the operation of threading the mails will be now described.

Projecting through the plate $b$ and secured upon the same near its left-hand end is a frame 93, downwardly-projecting arms 94 of which serve as bearings for a hollow shaft 95. From said shaft projects an arm 96, which is connected with the frame 93 by a spring 97. The rear end of the shaft is provided with another arm 98, which carries a roller 99, that is held against the outer one of two concentric camways on one face of the cam *r* by the spring 97. The outer end of said shaft 95 carries an upwardly-extending fork 100. Within the shaft is journaled another shaft 101, which carries at its outer end a lever 102 and which at its inner end is provided with an arm 103, carrying a roller 104, which bears against the inner concentric camway on the cam *r*. In order to keep the roller 104 in contact with the cam, a spring 105 connects the lever 102 with a stud 106 on the bracket 86.

Upon the frame 93 is sustained a yoke 107, between the arms of which there is supported a ring 108, a horizontal shaft 109 being journaled in said arms and carrying two hemispheres 110, which, together with said ring, form a spherical hopper. One of them is provided with a filling device 111 and carries a pulley 112, which is connected with the pulley *t* on the shaft *f* by a band 113. In order to manually actuate the shaft and the hemispheres, the former is provided with a crank 114. One side of its vertical center the hopper is provided with a tangentially-disposed discharge-way, the same consisting of a port 115, formed in an enlargement 116 of the ring. Upon a pin 117, projecting from the ring, is fulcrumed a small lever 118, from which project, the one on one side and the other on the other side of said enlargement, two bent fingers 119, the one being disposed above the other and each having its extremity adapted to move into one of the two orifices 120, that extend transversely through the enlargement, communicating with the port. The fingers are so arranged that as the lever vibrates said fingers will alternately act to close the port.

120', Fig. 20, designates a removable coverplate forming part of the enlargement, it being of course also penetrated by the orifices 120.

121 designates a rest which projects from the supporting portion 122 of the ring and which carries at its front end a rectangular guide 123, in which moves vertically a feeding-block 124, provided with a longitudinal groove 125, which when closed by a dovetailed slide 126, that is driven into the block, forms a port which registers with the port in the enlargement of the ring 108. A delicate spring 127 controls the lower end of this port.

The lower end of the lever 118 is provided with an angular slot 128, in which works a pin 129, projecting from the block 124, the reciprocation of the block being adapted to thus effect the vibration of the lever. The block is reciprocated by means of a rod 130, which connects a pin 131 on said block with a lever 132, which is fulcrumed in a hanger 133 suspended from the frame 93, said lever carrying a roller 134 at its rear end, which engages the camway on the periphery of the cam *r*, being held in contact therewith by a spring 135, which connects said lever and the frame 93.

It will be observed that when the shaft 109 is properly rotated the mails which have been placed in the hopper will be elevated by the rotating sphere and fed into the port 115, through which they are permitted to fall one by one by the vibrating pins 119 dropping into the port 125 of the block 124, and being held in said port by the spring 127. The movement of the mails past the fingers is facilitated by the action of a spring-controlled hammer 136, which is actuated by pins 137 projecting from one of the hemispheres, the head of the hammer being adapted to lightly tap the enlargement 116. The mails are fed lengthwise through the ports, approximately fitting them.

From the yoke 107 project two arms 138 139, in which is sustained a reciprocating sleeve 140, having a circumferential groove 141 at its forward end, into which extend diametrical projections 142 on the fork 100. The fork is of course adapted to reciprocate the sleeve. From the front end of the sleeve projects a pair of hooks 143, which, as shown in Figs. 22 and 23, may assume a vertical or horizontal plane. In the horizontal plane the spurs of the hooks project upwardly. Upon the sleeve is secured a collar 144, from which projects a pin 145, which engages an angular slot 146 in a plate 146', secured to the two arms 138 139. Thus as the sleeve is reciprocated it is also oscillated. Within the sleeve slides a plunger 147, having a spur 148 at its forward end and provided midway its ends with a reduced portion 149, around which is coiled a spring 150, which bears against the enlarged rear end of said plunger and a partition 151 in the sleeve. The plunger is guided by a pin 152, working in a slot 153 in the sleeve, it being necessary that the spur on the plunger, which is slightly bent for a reason hereinafter shown, maintain constantly the same position relatively to the hooks. In order to reciprocate the plunger, it is connected with the lever 102 by an angular rod 154 engaging its rear end. The movements of the lever and fork 102 and 100 in order to advance the plunger and sleeve are at the first synchronous. For a portion of their forward movement the sleeve is so disposed that the hooks are vertical. The sleeve and plunger advance together until the hooks and spur enter a notch 155 in the bottom of the feeding-block, where they enter the eyelets of the mail *a'*, (see Figs. 4 and 23ª,) taking the same from the feeding-block as the latter moves upwardly, which now occurs. Having momentarily stopped while the feeding-block was moving upwardly out of the way, the plunger and sleeve continue to advance, together turning over by the action of the pin and angular slot arrangement between said sleeve and the plate 146' until the spurs assume the horizontal position. It should be remarked that when the arm 9 swung over the free arm of the lever 57, which carries its hooks 58, was engaged by a stationary detent 156, throwing the hooks back out of the way, as shown in dotted lines in Fig. 1. It should also be remarked that each clip on the arm is provided with a vertical slot 157, formed between its two members. Into these vertical slots 157 the hooks 143 are projected by the advancing sleeve, and when they have entered the slots the arm 9 drops slightly still farther, so as to insure the loops of thread or cord which it carries being caught by the hooks, the sleeve at the same time withdrawing the hooks, so as to clear the clips. The arm now drops far enough to bring the points of the clips below the plunger, which now advances, its spur forcing the mail onto the loop of each thread, (which remains held by the corresponding hook,) one loop passing through each outer eye of the mail. Having forced the mail a sufficient distance onto the loops, the plunger is now withdrawn, the sleeve again making a slight advance movement until the spurs enter the slots in the clips on the arm 9, which has meantime returned, and then retracting just as the clips upon the further upward movement of the arm lift the loops off them. The sleeve and plunger now recede to their initial positions. Of course the action of the arm and of the sleeve and plunger all depends upon the shapes of the cams which control these parts. As the arm continues its upward movement its hooks 58 are permitted to snap back against the clips, and when it has swung over to its original position the loops still carrying the mail and each being still slipped over the end of one of the clips on the arm are looped over the pins 74, the one being upon the one side and the other on the other side of the levers carrying said pins.

It was above remarked that the spur 148 was slightly bent. The object of this is to insure the proper securing of the mail upon said spur and the hooks, so that it will not be jarred off by the motion of the machine.

It should be remarked that after the plunger has forced the mail upon the loops as far as it will go a finger 158, that is fulcrumed upon a pin 159 in the bracket 86, is adapted to swing upwardly between the loops, engaging the mail and pushing it still farther onto said loops. The finger 158 carries a small lever 160, having a pin 161, against the under side of which bears an arm 162, projecting from the shaft 95, and against the upper side of which impinges the end of a light spring 163, projecting from said arm. By this means the finger is vibrated. As the arm swings over to its initial position the mail drops down upon a curved-wire stop 164, which projects upwardly from one of the levers 75, the mail ultimately taking a position between said stop and an arrow-head or deflector 165 upon a support 166, which is secured upon a bracket 167, that is cast integral with a cross-piece 168, that spans the opening e in the table and is bolted to the latter.

On the arm 9 is fulcrumed a bell-crank lever 169, one arm of said lever having a pin-and-slot connection 170 with the lever 55. The free arm of said lever 169 is curved and is adapted to be engaged as the arm 9 approaches the limit of its return movement by a roller 171 on an arm 172, projecting from a rock-shaft 173, which is journaled in brackets 174 and 175, respectively, mounted upon the shaft 45 and the table. The rock-shaft 173 also carries another arm 176, having a roller 177, which bears against the camway of the cam o, being held in contact therewith by a spiral spring 178, coiled about the shaft and engaging the same and the bracket 174. The rock-shaft being actuated, the lever 169 works the lever 55 and opens the pairs of clips 19, around which the threads are looped. The opening of the clips of course effects the widening of the loops. It should be remarked that whereas the spacer-bars were apart when the arm swung over when it swings back said spacer-bars 61 come together again. Thus in the former case the threads were laid between them, whereas in the latter case they are passed outside of them. The clips now dropping to their extreme lowest position (the loop in each thread extending from the corresponding clip 19, which holds its extremity while the body portion of the thread itself lies in the guide 28, back inside of the spacer-bar, outside an arrow-head or deflector 179 and the other arrow-head 165, around the pin 74, and forward again outside of said arrow-heads and the spacer-bar to the corresponding clip on the arm 9) grasp the threads leading from the clips 19.

180 and 181 designate two knives which are pivoted upon a loose link 182, supported upon the table, the knives constituting shears. The ends of these knives have slotted arms 183 disposed at an angle to the knives themselves, the slots in said arms receiving a pin 184 on a lever 185, that is pivotally joined to another lever 186 on the shaft 45 by a connecting-rod 187. This last-named lever is normally held rearwardly by a spring 188, connecting it with the bracket 73. It carries a roller 189, which is held against the cam m by said spring. Mounted upon the table in front of the link 182 is an adjustable stop 190, against which said link is adapted to impinge as the cam advances the shears through the intermediate mechanism, so that said shears in the limit of their forward movement will be caused to close. Now referring to Figs. 15 and 16 it will be seen that after the clips have grasped the threads in the manner already described (still holding their loops) the knife 180 of the shears, which latter has been caused to advance, as above described, wiping against the clips forces the loop off the latter. Just before the shears close to cut the threads the clips 19 open, permitting the body portion of each thread which they hold to drop into them, immediately closing to grasp the same. The shears thereupon complete their movement, cutting the threads. At this point the clips on the arm 9 are grasping the loose ends of the cut-off portions of the threads, said loose ends constituting the end portions of nooses the bights of which extend around the spacer-bars 61 and the pins 74 of the levers 75, while a small piece of the original extremity of the thread and the new end formed therein remains held by each clip 19. (See Fig. 16.) As soon as the nooses are formed the carriage 80 moves backward under the actuation of the lever 89, which the cam $p$ operates, as already described, the elastic mounting of the levers 75 preventing any undue pull upon the nooses. It should be remarked at this point that at the moving back of the carriage the nooses are drawn up taut, extending around the spacer-bars 61 in line with the orifices 66 formed therein, being held there by the spurs 67. It should be also remarked that inasmuch as in forming the nooses each thread is doubled twice, first as the arm 9 swings over and then as said arm swings back, when in the claims such expressions as "auxiliary looping member," "auxiliary looping device," and the like are used reference is made to means which in engaging the thread after the first doubling coacts with the arm to produce the second doubling as said arm swings over to its initial position. In the embodiment of my invention illustrated such auxiliary members or devices are the pins on the levers 75. Likewise the expression "thread-looping member" (or "device," &c.) proper employed in the claims of course has reference to means which draws the thread toward the mail-threading mechanism and which in so doing produces the first doubling. In the said accompanying illustration of the invention such means is the arm 9 and its accessory parts. The operation of tying the knot in the two nooses now succeeds.

In the hook-bar 37 is formed a longitudinal groove 191, in which works a rod 192, carrying at its upper end an elastic fork 193, whose normal tendency is to assume a position with its forked upper end in proximity to the spacer-bars 61. The upper end of this fork is guided in a bracket 194, which is secured to the edge of the table in the recess $e$. From said rod project two lugs 195, between which projects the end of a lever 196, which is fulcrumed upon the shaft 45 and engages by means of a roller 197, mounted on its rear end, the periphery of the cam $o$. The roller is normally held in contact with said cam by a spring 198, which connects the lever with the rod $c$. By the mechanism just described after the nooses are formed the fork 193 is elevated and engages that portion of each thread which is between the nooses and the clips on the arm.

In the bracket 47 and in another bracket 199, which is suspended from the table, is journaled a rock-shaft 200, carrying a collar 201, fixed on said shaft, said collar and the bracket 47 being connected by a spring 202, normally acting upon the shaft to turn the same. Said shaft carries at its rear end an arm 203, provided with a roller 204, which is held against the camway on the cam $p$ opposite to that against which the roller 92 bears by the spring 202. At its forward end said rock-shaft carries another arm 205, whose slotted upper end engages a cross-piece 206, in which are swiveled the rear ends of reciprocating twister-bars 207, which penetrate an integral block 208 on the bracket 167, said bars being provided with cam-grooves 209, with which suitable keys in the form of screws 209' and mounted in the block 208 engage, so as to turn each bar a quarter-revolution in each of its longitudinal movements. 209$^a$ designates an auxiliary supporting-bracket for these bars. In its rearmost position each bar 207 is back of the corresponding spacer-bar 61, and as its forward end, which is notched, as shown in Fig. 13, advances through the orifice in said spacer-bar it engages the noose, and thereupon effects a twist in the latter as said bar turns over. (See Fig. 13.) The end of each noose (which the bar engages) is now advanced by the bar past the fork 193, a portion thereof being laid under that part of the threads which is intermediate the clips on the arm 9 and said fork. At this time the hooks 38, heretofore described, are elevated, engage the ends of the thread, as seen in Fig. 13, and immediately dropping draw said ends down through the small loop formed by twisting each noose. Thereupon the rock-shaft 173 is permitted by its actuating-cam to withdraw the roller 171 from contact with the lever 169, whereupon the mechanism intermediate said lever and the clips on the arm 9 effects the opening of said clips to release the ends of the nooses. The tension on the nooses being constantly maintained by the elastically-mounted levers 75, as the bars 207 retract they untwist the nooses, the knot being meantime drawn tight. The drawing up of the knots being effected by virtue of the tension which the elastic pin-carrying levers 75 exert, as soon as the fork 193 releases the thread, which now occurs, the fork retracts under the actuation of its controlling mechanism. As the ends of the bar 207 have receded through the spacer-bars the nooses are of course released and being thrown laterally by the inclined side edges of the arrow-heads 165 and 179 they are thrown off their corresponding pins 74, dropping down, so that the finished heddle-coupling is held by the arm 205 above the table, (with its mail adjacent said arm,) one of its loops being penetrated by one spacer-bar and the other of its loops by the other spacer-bar. In order to preserve the proper tension on the threads as the arm 9 swings over and back, I have provided a fork 210, carried by a lever 211, which is fulcrumed upon a shaft 212, and an arm 213 of which has a slot-and-pin connection 214 with a reciprocating rod 215, that is controlled by a spring 216 and carries a roller 217, which bears against the cam s. In order to guide the rod 215, its upper end has a fork 218, which engages a collar 219 of said cam.

The mechanism shown supported upon the right-hand end of the plate b is simply for indicating the number of couplings that have been completed. Upon a stud 220, projecting from said plate, is journaled a ratchet-wheel 221, carrying a pin 222, which is adapted to engage an elastic hammer 223, secured upon said plate and arranged to sound a gong 224, also secured upon the plate. The ratchet-wheel is actuated by a spring-actuated pawl 225, pivoted upon a lever 226, which is fulcrumed upon the stud 220, said lever being connected with another lever 227 by a rod 228. The lever 227 is normally held against a stop 229 by a spring 230 connecting it with the upright, and it is adapted to be engaged by a pin 231 on the gear g. Thus every time the gear revolves the ratchet-wheel is advanced one notch, and each time said ratchet completes a full revolution the gong is sounded. A stationary pointer 232 on the stud 220 serves, with a dial 233, which is provided on the face of the ratchet-wheel, as an auxiliary indicating mechanism.

Having thus fully described my invention, what I claim as new, and desire to secure by Letters Patent, is—

1. In a heddle-making machine, the combination, with a frame, of thread-holding means, a thread-looping device, and mechanism for threading the mails onto the loops of thread formed by said looping device, said looping device and the threading mechanism being movable the one into operative proximity to the other, substantially as described.

2. In a heddle-making machine, the combination, with a frame, of thread-holding means, a thread-looping device, and mechanism for threading the mails onto the loops of thread formed by said looping device, said looping device being movable from the holding means to the threading mechanism, substantially as described.

3. In a heddle-making machine, the combination, with a frame, of thread-holding means, a thread-looping device, mechanism for threading the mails onto the loops of thread formed by said looping device, said looping device being movable back and forth between the holding means and the threading mechanism, and auxiliary thread-looping means disposed intermediate said holding means and the threading mechanism, substantially as described.

4. In a heddle-making machine, the combination, with a frame, of thread-holding means, a thread-looping device, mechanism for threading the mails onto the loops of thread formed by said looping device, said looping device being movable back and forth between the holding means and the threading mechanism, auxiliary thread-looping means disposed intermediate said holding means and the threading mechanism, and knot-tying mechanism disposed adjacent the thread-holding means, substantially as described.

5. In a heddle-making machine, the combination, with a frame and with thread-holding means, of thread-looping mechanism and threading mechanism, one of said mechanisms being movable toward the other, substantially as described.

6. In a heddle-making machine, the combination, with a frame and with thread-holding means, of looping mechanism, threading mechanism, one of said mechanisms being movable toward the other, and knot-tying means, substantially as described.

7. In a heddle-making machine, the combination, with a frame, of thread-holding means, a fulcrumed thread-looping arm, and mechanism for threading the mails onto the loops of thread formed by said arm, said arm being disposed intermediate said holding means and the threading mechanism, substantially as described.

8. In a heddle-making machine, the combination, with a frame, of thread-holding means, a fulcrumed thread-looping arm, mechanism for threading the mails onto the loops of thread formed by said arm, said arm being fulcrumed between the holding means and the threading mechanism, and an auxiliary thread-looping means disposed intermediate said holding means and the threading mechanism, substantially as described.

9. In a heddle-making machine, the combination, with a frame, of thread-holding means, a fulcrumed thread-looping arm, mechanism for threading the mails onto the loops of thread formed by said arm, said arm being fulcrumed between the holding means and the threading mechanism, an auxiliary thread-looping means disposed intermediate said holding means and the threading mechanism, and knot-tying mechanism disposed adjacent the thread-holding means, substantially as described.

10. In a heddle-making machine, the combination, with the frame, of thread-holding means, a looping member, said member being adapted to loosely engage the thread held by the holding means, and said looping member and the holding means being coactive in forming the loops and one of them being movable, and means for threading the mails onto the loops of thread formed by said looping member, substantially as described.

11. In a heddle-making machine, the combination, with the frame, of thread-holding means, threading mechanism, a fulcrumed thread-looping member, and a pivoted device or devices carried by said looping member and coacting therewith to loosely engage the thread, said looping member being movable from said holding means to the threading mechanism, substantially as described.

12. In a heddle-making machine, the combination, with the frame, of thread-holding means, threading mechanism, comprising a longitudinally-movable hook or hooks adapted to penetrate an eye or eyes of the mail to be threaded and to engage the thread to thereupon draw the same through said eye or eyes, and a device or devices for maintaining a loop or loops in the thread or threads, said device or devices being movable transversely of said hooks, substantially as described.

13. In a heddle-making machine, the combination, with the frame, of thread-holding means, threading mechanism comprising longitudinally-movable hooks adapted to penetrate the eyes of the mails to be threaded and to engage the thread to thereupon draw the same through said eyes, devices for maintaining loops in the thread, said devices being movable transversely of said hooks and having openings adapted to receive the same, and means for displacing the mail held by said hooks off the same onto the loops engaged by said hooks, substantially as described.

14. In a heddle-making machine, the combination, with a frame, of thread-holding means, a fulcrumed thread-looping arm, a pair of fingers projecting from said arm, hooks carried by said arm and normally held against said fingers, said fingers and the hooks being adapted to coact to engage the thread, a detent disposed adjacent said holding means and adapted to be engaged by said hooks to move the same, mechanism for threading the mails onto the loops of thread formed by said looping-arm, said arm being fulcrumed between the thread-holding means and the threading mechanism, and another detent disposed adjacent said threading mechanism, and adapted also to be engaged by said hooks to move the same, substantially as described.

15. In a heddle-making machine, the combination, with the frame, of thread-holding means, a looping member having a hook, a rotary device having a cross-cut in one end, the thread being adapted to extend across the cross-cut of said device and said hook being adapted to enter the cross-cut to engage the thread, said holding means and the looping member being coactive to produce the loops and one being movable away from the other, substantially as described.

16. In a heddle-making machine, the combination, with a frame, of thread-holding means, a fulcrumed thread-looping arm, a a pair of fingers projecting from said arm, hooks carried by said arm and normally held against said fingers, said fingers and the hooks being adapted to coact to engage the threads, a detent disposed adjacent said holding means and adapted to be engaged by said hooks to move the same, vertical rotary bars having cross-cuts in their upper ends, the threads being adapted to rest on said bars spanning the cross-cuts, and said hooks being adapted to enter said cross-cuts to engage the threads, and mechanism for threading the mails onto the loops of thread formed by said looping-arm, said arm being movable from the holding means to the threading mechanism, substantially as described.

17. In a heddle-making machine, the combination, with a frame and with a drive-shaft journaled in said frame, of a cam arranged on said shaft, thread-holding means, a movable thread-looping arm, power-transmitting mechanism operatively connecting said cam and said arm, a mechanism for threading the mails onto the loops of thread formed by said looping-arm, and operative connection between said threading mechanism and the shaft, substantially as described.

18. In a heddle-making machine, the combination, with a frame and with a drive-shaft journaled in said frame, of cams arranged on said shaft, thread-holding means, a fulcrumed thread-looping arm, power-transmitting mechanism operatively connecting one of said cams and said arm, a mechanism for threading the mails onto the loops of thread formed by said looping-arm, operative connection between said threading mechanism and the shaft, knot-tying mechanism, and power-transmitting means operatively connecting said knot-tying mechanism and the other cams, substantially as described.

19. In a heddle-making machine, the combination, with a frame, of mechanism for threading the mails onto the threads or cords, mechanism for tying knots in the threads or cords, operative connecting means between said threading mechanism and the knot-tying mechanism adapted to effect coöperative action thereof, substantially as described.

20. In a heddle-making machine, the combination of a thread-holding means, a movable looping device adapted to engage the thread adjacent the holding means, and an auxiliary thread-looping means interposed between said holding means and the limit of movement of the looping device, substantially as described.

21. In a heddle-making machine, the combination of a thread-holding means, a fulcrumed looping-arm adapted to engage the thread adjacent the holding means, and an auxiliary thread-looping means interposed between said holding means and the limit of movement of the looping-arm, substantially as described.

22. In a heddle-making machine, the combination, with a frame, of a thread-holding means, a fulcrumed looping-arm, a hook carried by said arm, vertical rotary bars having cross-cuts in their upper ends, the threads being adapted to rest on said bars spanning the cross-cuts and said hook being adapted to enter the cross-cuts to engage the thread, means for rotating said bars, and means for actuating said arm, substantially as described.

23. In a heddle-making machine, the combination, with a frame, of a thread-holding means, a knot-tying mechanism, a looping device movable to and from said knot-tying mechanism, and auxiliary looping means interposed between said knot-tying mechanism and the limit of movement of said looping device, substantially as described.

24. In a heddle-making machine, the combination, with a frame, of a thread-holding means, a knot-tying mechanism, a looping device movable to and from said knot-tying mechanism, auxiliary looping means interposed between said knot-tying mechanism and the limit of movement of said looping device, and operative connecting means between said knot-tying mechanism and the looping device adapted to effect coöperative action thereof, substantially as described.

25. In a heddle-making machine, the combination, with a frame, of a thread-holding means, a knot-tying mechanism, a fulcrumed looping-arm movable to and from said knot-tying mechanism, and auxiliary looping means interposed between said knot-tying mechanism and the limit of movement of said looping-arm, substantially as described.

26. In a heddle-making machine, the combination, with the frame, of thread-holding means, means for threading the mails onto the thread, means for forming loops in the thread, and thread-cutting means, substantially as described.

27. In a heddle-making machine, the combination, with the frame, of thread-holding means, means for threading the mails onto the thread, means for forming loops in the thread, means for tying knots in the thread, and thread-cutting means, substantially as described.

28. In a heddle-making machine, the combination, with the frame, of thread-holding means, means for threading the mails onto the thread, and means for tying knots in the thread, substantially as described.

29. In a mail-feeding device for a heddle-machine, the combination of adjacent hollow sections together constituting a hopper for the mails, one of said sections being movable relatively to the other section about a substantially horizontal axis and said other section having a discharge-opening in elevated disposition relatively to the bottommost portion of the interior of said hopper, and the movable section being adapted to frictionally engage the contents of said hopper to elevate the same to the discharge-opening, substantially as described.

30. In a mail-feeding device for a heddle-machine, a substantially spherical hopper, said hopper being divided vertically into three sections of which the intermediate one is relatively narrow and has a discharge-opening in elevated disposition relatively to the bottommost portion of the interior of said hopper, and of which the other sections are movable about a substantially horizontal axis and adapted to frictionally engage the mails to elevate the same to the discharge-opening, substantially as described.

31. In a mail-feeding device for a heddle-machine, the combination of a substantially spherical hopper, said hopper being divided vertically into three sections of which the intermediate one is relatively narrow and has a discharge-opening in elevated disposition relatively to the bottommost portion of the interior of said hopper, and of which the other sections are movable about a substantially horizontal axis and adapted to frictionally engage the mails to elevate the same to the discharge-opening, and vibratory means controlling the discharge from said hopper, substantially as described.

32. In a mail-feeding mechanism for a heddle-machine, the combination of a suitable hopper having a discharge-port, a suitably-sustained vibratory part, fingers carried by said vibratory part and controlling said port, and a reciprocatory receiver for the mails alined with said port, said vibratory device and the receiver having a pin and oblique slot connection between them, substantially as described.

33. In a threading mechanism for a heddle-making machine, the combination, with the frame, of a hopper having a discharge-port, a receiver alined with said port and adapted to take the mails therefrom, hooks, said hooks and the receiver being coactive and the one being movable toward the other to deposit the mails on the former, and said hooks being adapted to penetrate the eyes of said mails, and means for engaging the thread with said hooks after the mails are deposited thereon, substantially as described.

34. In a threading mechanism for a heddle-making machine, the combination, with the frame, of a hopper having a discharge-port, a receiver alined with said port and adapted to take the mails therefrom, hooks, said hooks and the receiver being coactive and the one being movable toward the other to deposit the mails on the former, and said hooks being adapted to penetrate the eyes of said mails, means for engaging the thread with said hooks after the mails are deposited thereon, and means for effecting a relative movement between said hooks and the mail deposited on said hooks after the thread is engaged therewith, substantially as described.

35. In a threading mechanism for a heddle-making machine, the combination, with the frame, of a mail-feeding mechanism, a sleeve carrying hooks at one end, said sleeve being longitudinally movable to bring the hooks into operative proximity to the discharge of said feeding mechanism, a plunger inclosed in said sleeve, said hooks being adapted to receive a mail from the feeding mechanism, penetrating the eyes thereof, means for engaging the thread with said hooks after the mail has been deposited thereon, said mail being adapted to be engaged by the plunger, and means for longitudinally moving said sleeve to withdraw the hooks from the mail, substantially as described.

36. In a threading mechanism for a heddle-making machine, the combination, with the frame, of a mail-feeding mechanism having a discharge-port, means for maintaining a portion of each thread in operative proximity to said feeding mechanism, said means being arranged to hold said portions of the thread in a line which is at right angles to the line in which the eyes of each mail are located when discharged from the feeding mechanism, a reciprocatory device having hooks, said device being capable of movement from the discharge of the feeding mechanism to the thread-holding means, and means for rotating said device during said movement, said hooks being adapted to receive each mail, penetrating the eyes thereof, and engage the threads, substantially as described.

37. In a mechanism for threading mails onto thread, cord, &c., the combination, with means for holding the thread, of a device for holding the mails while being threaded, and means for drawing the thread through the eyes of the mails, said mail-holding device and the thread-drawing means being coactive and the one being movable relatively to the other, substantially as described.

38. In a mechanism for threading mails onto thread, cord, &c., the combination, with means for holding the thread, of a device for holding the mails while being threaded, means for drawing the thread through the eyes of the mails, said mail-holding device and the thread-drawing means being coactive and said drawing means being movable past the other, substantially as described.

39. In a mechanism for threading mails onto thread, cord, &c., the combination, with a mail-feeding mechanism, of means for holding the thread preliminarily to threading the mails, and a threading mechanism comprising a member movable from the feeding mechanism to the thread-holding means and adapted to carry the mail to be threaded, substantially as described.

40. In a mechanism for threading mails onto cord, thread or the like, the combination, with the mail to be threaded and with means for holding the cord preliminarily to threading said mail, of a hook or hooks adapted to penetrate an eye or eyes of the mail, said hook or hooks and the holding means being coactive in transferring the cord from the one to the other and the one being movable toward the other, and said mail and the hook or hooks being coactive in effecting the threading and the one being movable past the other, substantially as described.

41. In a mechanism for threading mails onto cord, thread or the like, the combination, with the mail to be threaded and with means for holding the cord preliminarily to threading said mail, of a hook or hooks adapted to penetrate an eye or eyes of the mail, said hook or hooks and the holding means being coactive in transferring the cord from the one to the other and the one being movable toward the other, and said mail and the hook or hooks being coactive in effecting the threading, and means for moving the mail past the hook to effect the threading, substantially as described.

42. In a mechanism for threading mails onto cord, thread, or the like, the combination, with a mail-feeding mechanism, of means for holding the thread preliminarily to threading the mails, and a threading mechanism comprising a thread-drawing member and a plunger, said drawing member and the plunger being movable together toward the thread-holding means and the former in advance of the latter away from said thread-holding means, and said drawing member having a device adapted to penetrate the eyes of the mails and engage the thread, substantially as described.

43. In a mechanism for forming nooses in cord, thread and the like, the combination, with a thread-supply and with thread-holding means, of a looping member proper, coacting parts carried by said member, the portion of thread intermediate the supply and holding means being adapted to loosely extend between said parts and one of said parts constituting a clip, an auxiliary looping member disposed on the clip side of said looping member proper, the portion of the thread intermediate said looping member proper, on the one hand, and said supply and holding means on the other hand, being adapted to be extended around said auxiliary looping member thus producing a loop which extends around the clip, and means for moving the clip into operative proximity to the portion of the thread intermediate said auxiliary looping member and the thread-supply, said clip being adapted to thereupon engage said last-named portion of the thread preparatory to producing the noose, substantially as described.

44. In a mechanism for forming nooses in cord, thread and the like, the combination, with a thread-supply and with thread-holding means, of a looping member proper, coacting parts carried by said member, the portion of thread intermediate the supply and holding means being adapted to loosely extend between said parts and one of said parts constituting a clip, an auxiliary looping member disposed on the clip side of said looping member proper, the portion of the thread intermediate said looping member proper, on the one hand, and said supply and holding means, on the other hand, being adapted to be extended around said auxiliary looping member thus producing a loop which extends around the clip, means for moving the clip into operative proximity to the portion of the thread intermediate said auxiliary looping member and the supply and holding means, and means for forcing the loop off the clip after said clip engages said last-named portion of the thread, substantially as described.

45. In a mechanism for forming nooses in cord, thread and the like, the combination, with a thread-supply and with thread-holding means, of a looping member proper, coacting parts carried by said looping member, the portion of the thread intermediate the supply and holding means being adapted to loosely extend between said parts, one of said parts comprising coacting clip members, an auxiliary looping member disposed on the side of said looping member proper adjacent said clip members, the portion of the thread intermediate said looping member proper, on the one hand, and said supply and holding means, on the other hand, being adapted to be extended around said auxiliary looping member, thus producing a loop which extends around the clip members, and said looping member being movable to bring the clip members into operative proximity to the portion of the thread intermediate said auxiliary looping member and the thread-supply, and means for actuating said clip members to effect their engagement with said last-named portion of the thread preparatory to producing the noose, substantially as described.

46. In a mechanism for forming nooses in cord, thread and the like, the combination, with a thread-supply and with spaced thread-holding devices, of a rotary device having a cross-cut in one end and disposed between said thread-holding devices, the thread being adapted to extend across the cross-cut of said rotary device, a fulcrumed looping member, coacting parts carried by said looping member, one of said parts consisting of a fulcrumed hook and the other of said parts comprising coacting clip members, said clip members being adjacent the fulcrum of said looping member, an auxiliary looping member disposed substantially between said fulcrum and said thread-holding devices, the portion of the thread intermediate the holding devices being adapted to loosely extend between said hooks and the clips, and the portion of the thread intermediate said looping member proper, on the one hand, and said holding devices, on the other hand, being adapted to be extended around said auxiliary looping member, thus producing a loop which extends around the clip members, and means for actuating said clip members to effect their engagement with said last-named portion of the thread preparatory to producing the noose, substantially as described.

47. In a mechanism for forming nooses in cord, thread and the like, the combination, with a thread-supply and with spaced thread-holding devices, of a rotary device having a cross-cut in one end and disposed between said thread-holding devices, the thread being adapted to extend across the cross-cut of said rotary device, a fulcrumed looping member, coacting parts carried by said looping member, one of said parts consisting of a fulcrumed hook and the other of said parts comprising coacting clip members, said clip members being adjacent the fulcrum of said looping member, a movable auxiliary looping member disposed substantially between said fulcrum and said thread-holding devices, the portion of the thread intermediate the holding devices being adapted to loosely extend between said hooks and the clips, and the portion of the thread intermediate said looping member proper, on the one hand, and said holding devices on the other hand, being adapted to be extended around said auxiliary looping member, thus producing a loop which extends around the clip member, and means for actuating said clip members to effect their engagement with said last-named portion of the thread preparatory to producing the noose, substantially as described.

48. In a mechanism for forming nooses in cord, thread and the like, the combination, with a thread-supply and with spaced thread-holding devices, of a rotary device having a cross-cut in one end and disposed between said thread-holding devices, the thread being adapted to extend across the cross-cut of said rotary device, a fulcrumed looping member, coacting parts carried by said looping member, one of said parts consisting of a fulcrumed hook and the other of said parts comprising coacting clip members, said clip members being adjacent the fulcrum of said looping member, a movable carriage, an elastic pin-carrying lever mounted on said carriage and constituting an auxiliary looping member, the portion of the thread intermediate the holding devices being adapted to loosely extend between said hooks and the clips, and the portion of the thread intermediate said looping member proper, on the one hand, and said holding devices, on the other hand, being adapted to be extended around said auxiliary looping member, thus producing a loop which extends around the clip members, and means for actuating said clip members to effect their engagement with said last-named portion of the thread preparatory to producing the noose, substantially as described.

49. In a mechanism for forming nooses in cord, thread and the like, the combination, with a thread-supply and with thread-holding means, of a fulcrumed thread-looping arm, coacting parts carried the one nearer the end of said arm than the other, the portion of the thread intermediate the supply and holding means being adapted to be caught by said coacting parts, extending loosely between them, and the inner one of said parts constituting a clip, an auxiliary looping device disposed substantially between the fulcrum of said arm and said supply and holding means, the portion of the thread intermediate said coacting parts, on the one hand, and said supply and holding means, on the other hand, being adapted to be extended around said auxiliary looping member, thus producing a loop which extends around the clip, and means for actuating the clip to effect its engagement with said last-named portion of the thread preparatory to producing the noose, substantially as described.

50. In a mechanism for forming nooses in cord, thread and the like, the combination, with a thread-supply and with thread-holding means, of a fulcrumed thread-looping arm, pairs of coacting parts carried the one in each pair nearer the end of said arm than the other, the portions of thread intermediate the supply and holding means being adapted to be caught by said pairs of coacting parts, extending loosely between them, and the inner one of each pair of parts constituting a clip, auxiliary looping devices disposed substantially between the fulcrum of said arm and said supply and holding means, a pair of spacer-bars disposed between said auxiliary looping devices and the supply and holding means, the portions of the thread intermediate said pairs of coacting parts, on the one hand, and said supply and holding means, on the other hand, being adapted to be extended around the respective spacer-bars and the auxiliary looping members, thus producing a loop which extends around the clip, and means for actuating the clips to effect their engagement with said last-named portions of the thread preparatory to producing the noose, substantially as described.

51. In a mechanism for securing a slip-noose previously formed in cord, thread and the like, and thus converting such noose into a permanent loop, the combination, with means for holding the bight of the noose and with means, also, for holding the end portions of said noose, of a rotary device adapted to engage the bight on the inside thereof and to twist the same, said device and said last-named means having relative movement the one toward the other to bring said end portions and the engaged portion into relatively traversed disposition, and means for drawing said end portions of the noose through the bight between the crossing therein and the engaged portion thereof, substantially as described.

52. In a mechanism for securing a slip-noose previously formed in cord, thread and the like, and thus converting such noose into a permanent loop, the combination, with means for holding the bight of the noose and with means, also, for holding the end portions of said noose, of a reciprocating rotary device adapted to engage the bight on the inside thereof and to twist the same and carry the engaged portion thereof into traversed relation with regard to said end portions of the noose, and means for drawing said end portions through said bight between the crossing therein and the engaged portion thereof, substantially as described.

53. In a mechanism for securing a slip-noose previously formed in cord, thread and the like, and thus converting such noose into a permanent loop, the combination, with means for holding the bight of the noose, and with means, also, for holding the end portions of said noose, of a reciprocating part, a stationary part, a rotary device operatively connected to said reciprocating part for movement therewith and having threaded connection with said stationary part, said device being adapted to engage the bight on the inside thereof and to twist the same, and the engaged portion of said bight being adapted to be carried by said device into traversed relation with regard to the end portions of the noose, and means for drawing said end portions through said bight between the crossing therein and the engaged portion thereof, substantially as described.

54. In a mechanism for securing a slip-noose previously formed in cord, thread and the like, and thus converting such noose into a permanent loop, the combination, with spaced holding devices for the bight of the noose, one of said devices being elastic, of spaced holding devices for the end portions of said noose, one of said last-named holding devices being movable out of engagement with the thread, a bight-twisting device, said twisting device being movable to bring the bight and the end portions of said noose into relatively traversed disposition, and means for drawing the end portions of said noose through the bight thereof, substantially as described.

55. In a mechanism for securing a slip-noose previously formed in cord, thread and the like, and thus converting said noose into a permanent loop, the combination, with spaced holding devices for the bight of the noose, one of said devices being elastic, of spaced holding devices for the end portions of said noose, one of said last-named holding devices being movable out of engagement with the thread, a reciprocating part, a stationary part, a rotary bar operatively connected to said reciprocating part for movement therewith and having threaded connection with said stationary part, said bar being adapted to engage the bight on the inside thereof and to twist the same, and said bar being movable past said movable holding device, means for actuating said movable holding device, said rotary bar being adapted to bring the bight into relatively traversed disposition with regard to the end portions of the noose, a hook movable transversely with regard to said bar, said hook being adapted to draw the end portions of the noose through the bight thereof, and means for actuating said hook, substantially as described.

56. In a mechanism for securing slip-nooses previously formed in cord, thread and the like, and thus converting such nooses into permanent loops, the combination, with an elastically-mounted lever and with relatively movable spacer-bars, said lever and the spacer-bars being adapted as holding devices for the bights of the nooses, of spaced holding devices for the end portions of said nooses, one of said last-named holding devices being movable out of engagement with the nooses, a reciprocating part, a stationary part, a pair of rotary bars operatively connected to said reciprocating part for movement therewith and having threaded connection with said stationary part, said bars being adapted to engage the bights on the inside thereof and to twist the same, and said rotary bars being disposed transversely to said spacer-bars and the movable holding device and being movable past the same, means for actuating said movable holding device, said rotary bars being adapted to bring the bights into relatively traversed disposition with regard to the end portions of the nooses, hooks movable transversely with regard to said bars, said hooks being adapted to draw the end portions of the nooses through the bights thereof, and means for actuating said hooks, substantially as described.

57. In a mechanism for securing slip-nooses previously formed in cord, thread and the like and thus converting such nooses into permanent loops, the combination, with spaced holding devices for the bights of the nooses, said devices comprising relatively movable spacer-bars, of holding means for the end portions of the nooses, a pair of rotary reciprocating twister-bars, said spacer-bars having openings adapted to receive said twister-bars and said twister-bars being movable through said openings, means for reciprocating and rotating said twister-bars, the bights being adapted to traverse said openings and said twister-bars being adapted to twist the bights and carry them into relatively traversed disposition with reference to the end portions of said nooses, and means for drawing said end portions through the bights, substantially as described.

58. In a mechanism for forming slip-nooses in cord, thread and the like and thereby securing such nooses to thus convert the same into permanent loops, the combination, with receiving devices for the bights of the nooses, of noose-forming means, spaced holding devices for the end portions of the nooses, a rotary and reciprocating bight-twisting device movable to bring the bights and end portions of the nooses into relatively traversed disposition, and means for drawing said end portions of the nooses through the bights thereof, substantially as described.

59. In a heddle-making machine, the combination of a substantially vertically arranged bar, a substantially horizontal pin, supporting means for said pin and the bar, said pin and bar being adapted to receive one of the loops of the heddle and the one being movable toward the other, and a deflector disposed between said pin and the bar and adapted, upon the relative movement of the one toward the other, to displace the loop from said pin, substantially as described.

60. In a heddle-making machine, the combination of a substantially vertically arranged bar or bars, substantially horizontal and oppositely-extending pins, supporting means for said pins and the bar or bars, said pins and said bar or bars being relatively movable the one toward the other and the loops of the heddle being adapted to be received by the bar or bars and, respectively, by said pins, and a tapering deflector disposed between said pins and the bars and adapted, upon the relative movement of the one toward the other, to displace the loops from said pins, substantially as described.

61. In a heddle-making machine, the combination, with a frame, of a substantially vertically arranged bar or bars, a movable support arranged in said frame, levers carried by said support, substantially horizontal and oppositely-extended pins carried by said levers, the loops of the heddle being adapted to be received by the bar or bars and, respectively, by said pins, and a tapering deflector disposed between said pins and the bars and adapted, upon the relative movement of the one toward the other, to displace the loops from said pins, substantially as described.

62. In a heddle-making machine, the combination, with a frame, of a substantially vertically arranged bar or bars, a movable support arranged in said frame, elastically-controlled levers carried by said support, substantially horizontal and oppositely-extending pins carried by said levers, the loops of the heddle being adapted to be received by the bar or bars and, respectively, by said pins, and a tapering deflector disposed between said pins and the bars and adapted, upon the relative movement of the one toward the other, to displace the loops from said pins, substantially as described.

63. In a heddle-making machine, the combination, with a frame, of means for holding the thread, cord and the like for forming the loops of the heddles, a looping member proper, means for threading the mails onto the loops formed in the thread, said member being movable from the thread-holding means to the mail-threading means, an auxiliary looping member, said auxiliary looping member, the looping member proper and the thread-holding means being coactive to form nooses in the thread, and means for knotting the nooses and thereby converting the same into permanent loops, substantially as described.

64. In a heddle-making machine, the combination, with a frame, of means for holding the thread, cord and the like for forming the loops of the heddles, a looping member proper, means for threading the mails onto the loops formed in the thread, said member being movable from the thread-holding means to the mail-threading means, substantially vertical devices, substantially horizontal pins carried by said devices and adapted to coact with said member in forming loops in the thread, and a curved guard extending substantially over said devices, substantially as described.

65. The combination, in a cutting mechanism, of a suitable support, a lever fulcrumed in said support, a suitable stop adapted to be engaged by said lever, coacting knives having a common fulcrum on said lever and constituting shears, said knives having slots disposed obliquely to each other, and another lever fulcrumed in said support and engaging said knives in the slots thereof, substantially as described.

In testimony that I claim the foregoing I have hereto set my hand this 29th day of August, 1900.

ROBERT W. BARKER.

Witnesses:
ALFRED GARTNER,
JAMES B. NEWTON.